United States Patent

Kitanosono et al.

[15] 3,678,354
[45] July 18, 1972

[54] DC MOTOR CONTROL APPARATUS

[72] Inventors: Tatsushi Kitanosono, Yokohama-shi; Yukio Mashimo; Yoshiyuki Takishima, both of Tokyo, all of Japan

[73] Assignee: Canon Kabushiki Kaisha, Tokyo, Japan

[22] Filed: Oct. 13, 1969

[21] Appl. No.: 865,587

[30] Foreign Application Priority Data

| Oct. 16, 1968 | Japan | 43/75378 |
| Oct. 16, 1968 | Japan | 43/75379 |
| June 6, 1969 | Japan | 44/44481 |
| Aug. 20, 1969 | Japan | 44/65817 |

[52] U.S. Cl. ............................................. 318/294
[51] Int. Cl. ........................................... H02k 7/22
[58] Field of Search .............. 318/258, 674, 663, 265, 294, 318/293, 466, 20.810, 20.835, 20.605, 20.821; 323/75 E

[56] References Cited

UNITED STATES PATENTS

| 3,028,531 | 4/1962 | Heiberger | 318/674 |
| 3,068,388 | 12/1962 | Burski | 323/75 E |
| 3,309,589 | 3/1967 | Luyten | 318/663 |
| 2,846,630 | 8/1968 | Boyle et al. | 318/20.835 |
| 3,483,554 | 12/1969 | Gower | 318/20.605 |

*Primary Examiner*—Bernard A. Gilheany
*Assistant Examiner*—W. E. Duncanson, Jr.
*Attorney*—Ward, McElhannon, Brooks & Fitzpatrick

[57] ABSTRACT

Apparatus for controlling the drive of a direct current (DC) motor to permit it to be rotated reversibly, which comprises a motor driving circuit with a DC motor and switching means connected in series with an alternating current (AC) source and a resistor bridge circuit for controlling the switching means. The DC motor is driven to rotate reversibly under the control of the switching means to be energized by the output voltage of pickup terminals of said resistor bridge circuit to bring a controlled object into the predetermined position.

7 Claims, 16 Drawing Figures

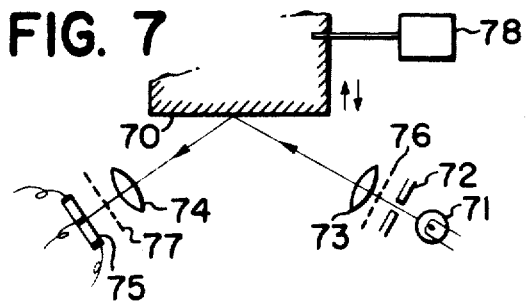
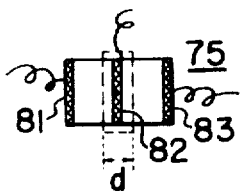
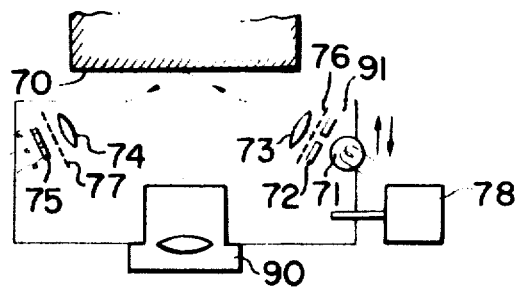
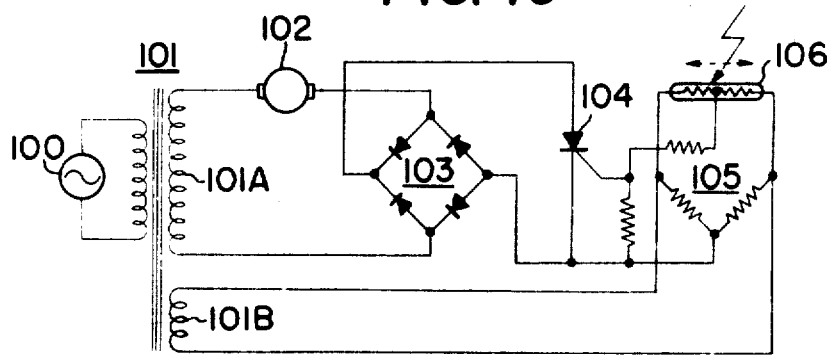
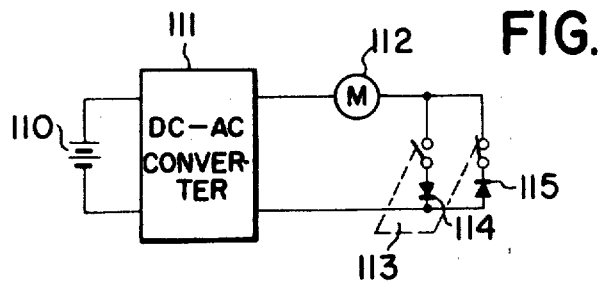

A DC MOTOR CONTROL APPARATUS

This invention relates to an apparatus for controlling a DC motor and more particularly to apparatus for driving a DC motor to permit it to be rotated reversibly, said motor being controlled by an output voltage of pickup terminals of a resistor bridge circuit to bring a controlled object into the predetermined position. This motor is connected in series with an AC driving source with a switching means. Normally a reversibly rotatable DC motor requires means for switching the polarity of the driving DC source. For this purpose, many electronic circuits for switching the polarity of the driving DC source have been developed. These circuits are complicated and have difficult problems that require precise control of the degree of reversible rotation with high stability. In an apparatus for this type, however, from the standpoint of manufacturing cost and control, it is desirable to simplify the apparatus and to make it compact and reliable.

Accordingly, an object of this invention is to provide a novel and improved apparatus for controlling a DC motor to permit it to be rotated reversibly with an AC source, where the motor is phase controlled by an output of pickup terminals of a resistance bridge circuit.

Another object of the present invention is to control the rotational speed of the DC motor by controlling the firing angle of switching elements by the unbalanced output of the bridge.

Another object of this invention is to phase-control the DC motor by connecting a resistance bridge to the alternating current source of the same frequency as that of the alternating current source connected to the motor.

A further object of this invention is to provide a DC motor control apparatus adapted to make it possible to close or to open the motor driving circuit whenever a resistance bridge circuit is brought into the balance state.

A still further object of this invention is to provide a DC motor control apparatus capable of rotating the DC motor in either direction by actuating the switching element into a conductive state in response to the unbalanced state of the bridge, and stopping the DC motor by driving the switching element into the non-conductive state when the bridge is balanced, thereby to control the speed of the DC motor in response to the firing angle of the switching element.

A further another object of the present invention is to provide a DC motor control apparatus capable of stopping the DC motor by driving the switching element into the conductive state when the bridge is balanced, and rotating the DC motor in either direction by driving the switching element into the conductive state during either of the positive or negative half cycles when the bridge is unbalanced, thereby to damp or retard the DC motor.

A still further object of this invention is to attain a servomechanism, wherein a resistance bridge circuit is brought into balance automatically in response to the operation of the driving motor. Bridge balance may be attained with at least one adjustable photoconductive element included in a resistance bridge circuit. With the apparatus so constructed, an optical device such as a photographic camera, a slide projector and so on may be so simplified and automatized.

A still further object of the invention is to provide a portable audio and/or visual apparatus which comprises a DC source and a DC-to-AC converter, with the DC motor being driven by converted alternating current.

According to one aspect of the present invention, a DC motor may be reversed in rotation by a simple means without employing a contact switch or the like. The DC motor control apparatus in accordance with the present invention for controlling the rotation of the motor in either direction and the speed thereof is best suited for use in an automatic control of a miniaturized DC motor. The conventional system for controlling the reverse of rotation and the speed of a miniaturized DC motor. The conventional system for controlling the reverse of rotation and the speed of a miniaturized DC motor used in a servomechanism or the like generally uses a control circuit employing transistors and so on. But such control circuit is so complicated in construction that it is very difficult to incorporate same in miniature equipment.

The control apparatus in accordance with the invention is simple in construction and best suited for use with miniature equipment, the direction of rotation in either direction and the speed of a DC motor being driven by an AC source through a rectifier.

According to one embodiment of the present invention, the control apparatus is comprised of a driving unit consisting of an AC power source, a DC motor, a bridge rectifier and a switching means connected across the DC output terminals of the bridge rectifier; and a control unit comprising a resistance bridge circuit, whereby the rotation in either direction of and speed of the DC motor may be controlled by selectively switching the switching means during a positive or negative half cycle of the alternating current from the AC power source.

In accordance with the present invention, the reverse phase current is applied to the DC motor which is rotated in one half cycle of the alternating current by the unbalanced output of the bridge so that the damping force is increased as the motor gradually approaches a standstill, thereby eliminating hunting and ensuring a stable servo operation. Thus since the servomechanism best suited for a miniature machine, instrument or equipment may be constituted by a circuit simple in construction according to the present invention, the servomechanism can be advantageously and easily incorporated in the miniature machines, instruments or equipments such as cameras, projectors, etc.

According to a further embodiment of the present invention, there is provided a DC battery source, a DC-AC converter and a plurality of switching means with some switching means conducting the current in one direction while the others, in the opposite direction so that the direction of the current to be supplied to the driving means for the portable machines or the like may be selectively changed by switching said switching means. Thus, the "dynamic range" of the present invention can be further widened as compared with the conventional system wherein a DC motor is driven only by the direct current, and the control by the normal rotation is possible. Furthermore, alternating current power is supplied from the DC battery source to DC motor through the DC-AC converter so that the apparatus of the present invention is best suited for use with conventional portable machines. The apparatus of the present invention may be provided with AC terminals so that the motor or the like may be directly driven by the exterior AC source when required.

The above and other objects, features and advantages of the present invention will become more apparent from the following descriptions of some illustrative embodiments thereof in conjunction with the accompanying drawings, in which:

FIG. 7 is a sectional and schematic diagram for explanation of the principle of an automatic surface position control device to which the present invention is effectively applicable;

FIG. 8 is a front view of a three-terminal photoconductive element used in the device of FIG. 7;

FIG. 9 is a schematic diagram of modified automatic surface position control device to which is applied the present invention for an automatic focusing device of a slide projector;

FIG. 10 is a circuit diagram of a DC motor control apparatus in which the present invention is applied to an automatic surface position control device;

FIG. 11 is a schematic diagram of a DC motor control apparatus for portable machines in accordance with the present invention.

DESCRIPTION OF THE PREFERRED EMBODIMENTS

Figure 1:
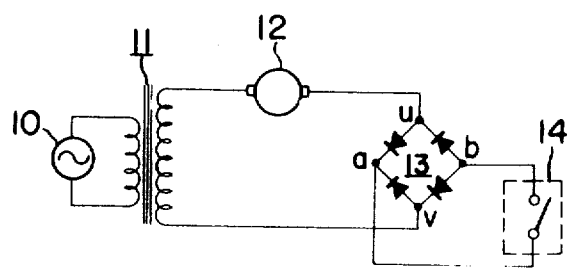
FIG. 1 is a schematic diagram showing the principle of the DC motor control apparatus in accordance with the present invention.

FIG. 1 illustrates the principle of the DC motor control apparatus in accordance with the present invention. Reference numeral 10 designates an AC source of which voltage is stepped down by a transformer 11. A DC 12 motor is connected to the secondary winding of the transformer 11, 13 is a bridge consisting of four diodes, and 14 is a switch. As illustrated in FIG. 1, the AC source 10, the DC motor 12 and the bridge rectifier are connected in series through the transformer 11 and the switch 14 is connected to the DC output terminals $a$ and $b$ of the bridge rectifier 13. The switch 14 is adapted to be "phase-controlled" by a device (not shown) in such a manner that when the switch 14 is opened, the connection between the terminals $u$ and $v$ of the bridge rectifier 13 is cut off, thereby stopping the current flow to the DC motor 12 and holding it at a standstill. When the switch 14 is closed during a positive half cycle of alternating current from the AC source 10, the current is supplied to the DC motor 12 only during this positive half cycle in the forward direction so that the DC motor rotates in the forward direction.

Figure 2:
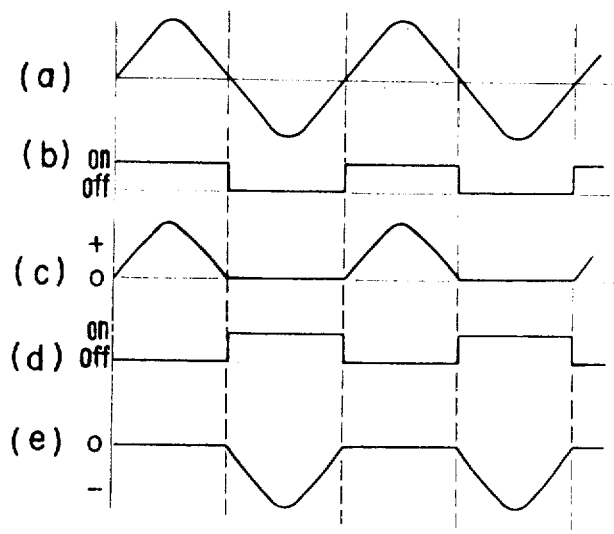
FIG. 2 shows the waveforms in the components included in the apparatus shown in FIG. 1.

FIG. 2 illustrates the waveforms of the currents in the components of the circuit illustrated in FIG. 1. Assuming that the waveform of the current at the AC source is shown in FIG. 2 ($a$) and the switch 14 is switched on and off as shown in FIG. 2 ($b$), the current having the waveform as shown in FIG. 2 ($c$) is supplied to the DC motor 12.

On the other hand, when the switch 14 is closed during a negative half cycle of the alternating current as shown in FIG. 2 ($d$), the current having the waveform as shown in FIG. 2 ($e$) is supplied to the DC motor 12, so that it rotates in the reverse direction. Thus it is seen that by selectively opening and closing the switch 14 as described above, the DC motor 12 may be rotated in either direction and stopped as desired.

Figure 3:
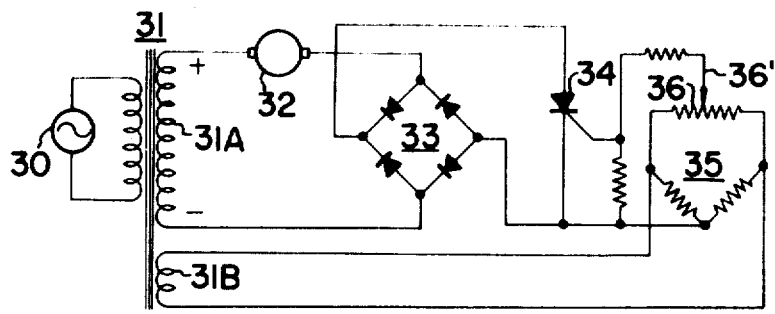
FIG. 3 is a circuit diagram of one embodiment of a DC motor control apparatus in accordance with the present invention.

FIG. 3 is a circuit diagram of one embodiment of a DC motor control apparatus in accordance with the present invention. Reference numeral 30 designates an AC source of which voltage is stepped down by a transformer 31. The transformer 31 has two secondary windings 31A and 31B. To one of the secondary windings 31A the DC motor and a bridge rectifier 33 are connected in series. Across another terminal of the rectifier 33 a silicon controlled rectifier (SCR) 34 is connected to a gate electrode which is connected to a resistance bridge 35 connected across the other of the secondary windings 31B.

Figure 4:
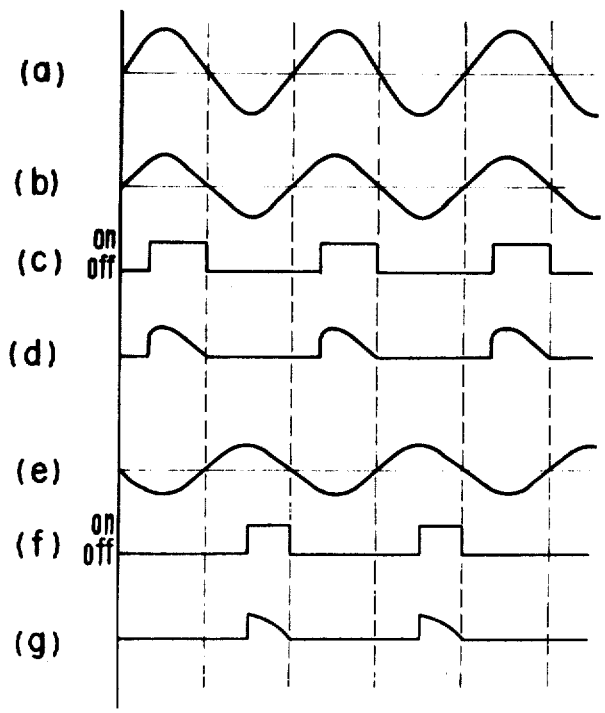
FIG. 4 shows the waveforms in the components included in the apparatus shown in FIG. 3.
Figure 3A:
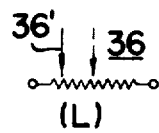
Figure 3B:
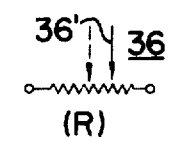

FIG. 4 illustrates the waveforms of the currents passing through the components of the circuit of FIG. 3. The source 30 supplies the current having the waveform shown in FIG. 4 ($a$). When a potentiometer 36 constituting two adjacent arms of the bridge rectifier 35 is so adjusted as not to produce any unbalanced output across the bridge output terminals, no control or regulating voltage is applied to the control electrode of SCR 34. That is, SCR 34 is not fired so that no current flows through the series circuit including the DC motor 32 and the bridge rectifier 33, thereby holding the DC motor at a standstill.

Upon displacement of the arm 36' of the potentiometer to the left as shown in FIG. 3 A, the unbalanced voltage as shown in FIG. 4 ($b$) is produced across the output terminals of the bridge 35 because of the above displacement from the neutral point so that SCR is fired and driven into conductive state only during the period shown in FIG. 4 ($c$) and the current having the waveform as shown in FIG. 4 ($d$) is supplied to the DC motor, thereby rotating it in the forward direction. In this case, the firing angle of the current is a function of the displacement of the arm 36' of the potentiometer 36 from the neutral point. Thus it will be seen that the speed of the DC motor may be varied by displacing the arm 36' of the potentiometer.

Figure 5:
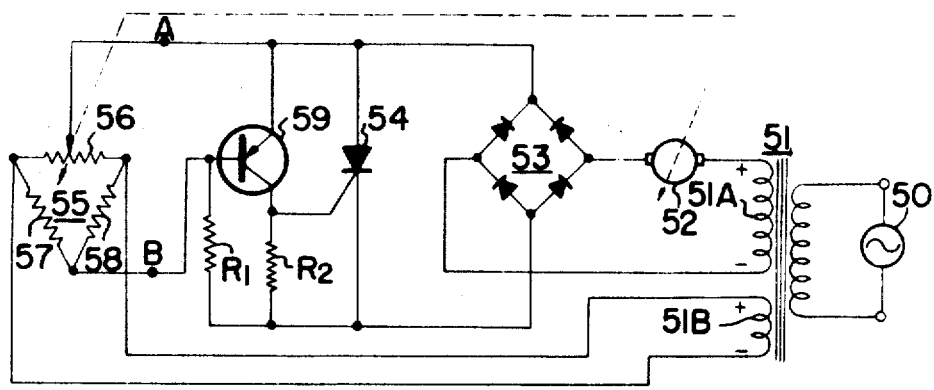
FIG. 5 is a circuit diagram of another embodiment of a servomechanism control apparatus in accordance with the present invention.

When the arm 36' of the potentiometer 36 is shifted to the right as shown in FIG. 3 B, the rotation of the DC motor is reversed. In this case, the waveforms of the unbalanced voltage, the currents flowing through SCR and the DC motor are shown in FIG. 4 ($e$), ($f$) and ($g$) respectively. Thus it is seen that in the DC motor control apparatus in accordance with the present invention when the voltage in phase with the AC source applied to DC motor is applied across the resistance bridge of the control circuit and the slidable arm 36' of the potentiometer forming two adjacent arms of the bridge is adjusted with respect to the neutral point, the directions of rotation, stop and speed of the DC motor may be controlled. FIG. 5 illustrates a circuit diagram of an another embodiment of the present invention which can eliminate the hunting caused by the inertia of the DC motor. The instant apparatus is provided with a detection circuit for applying a brake to the servomechanism. In the embodiment illustrated in FIG. 5, the current having the half-wave rectified waveform is supplied to the DC motor so as to regulate the direction of rotation of the DC motor under the phase control of the current supplied. When the bridge is balanced, the DC motor is stopped and SCR is extinguished. In the embodiment of FIG. 5, the SCR for controlling a servomotor is fired only during alternating current half cycles when the bridge is unbalanced so as to flow the half-wave-rectified current to the servomotor. On the other hand, when the bridge is balanced the, SCR is fired during the whole cycle, that is, during both of the positive and negative half cycles, so that the alternating current is supplied to the servomotor, thereby eliminating the hunting caused when the motor is stopped and stopping the motor precisely at a desired position.

Referring again to FIG. 5, an alternating current source 50 is coupled to a transformer 51. The transformer 51 has two secondary windings 51A and 51B one of which has a DC motor 52 and a full wave rectifier 53 connected in series and the other of which has a resistance bridge 55. The bridge 55 consists of resistors 57 and 58, and a potentiometer 56. The output terminals of the resistance bridge 55 are connected across the emitter and base of a transistor 59 which is connected across the DC output terminals of the bridge rectifier 53. A SCR 54 is also connected across the output terminals of the bridge rectifier 53 a gate electrode of which is connected to the collector of the transistor 59.

Figure 6:
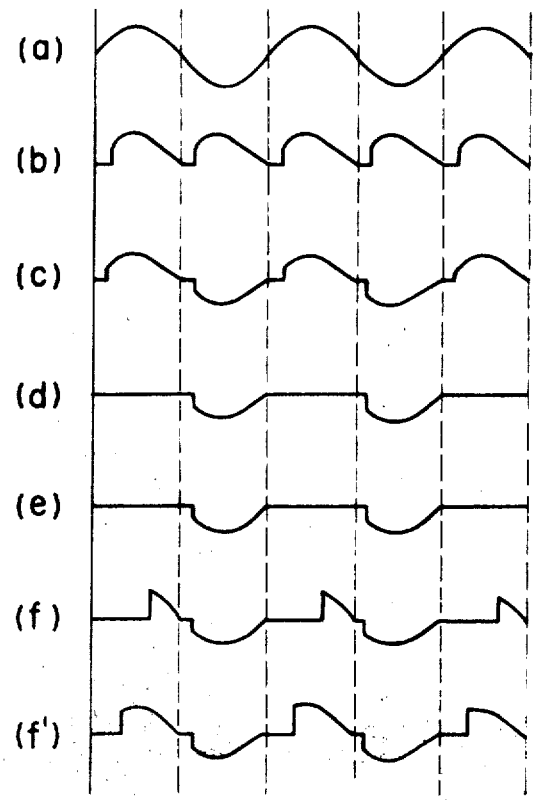
FIG. 6 shows the waveforms in the components included in the apparatus shown in FIG. 5.

FIG. 6 represents the various waveforms occurring in the apparatus shown in FIG. 5. FIG. 6 ($a$) shows the waveform of the AC source 50. When the bridge 55 is balanced, the voltage across the output terminals A and B thereof is zero. In this case, the transistor 59 is applied with the full wave rectified current from the AC source 50 through the bridge rectifier 53 and is rendered conductive with the current flowing from the emitter to the base thereof and to the resistor $R_1$. Therefore, the collector current of the transistor 59 flows through the resistor $R_2$ so that the SCR 54 is driven into conduction. As shown in FIG. 6 ($b$), the waveform of the current through the resistor $R_2$ is almost similar to the full wave rectified current waveform so that the current having the waveform illustrated in FIG. 6 ($c$) is supplied to the servomotor (a DC motor), thereby holding it at a standstill. When the bridge 55 is unbalanced, alternating current is applied across the base and emitter of the transistor 59 from the AC source 50 through a secondary winding 51B. In this case, in either half cycle of the full wave rectified voltage, the collector current is cancelled due to the phase relation so that the half wave rectified voltage is applied to the control electrode of the SCR as shown in FIG. 6 ($d$). Thus the SCR is rendered conductive only during one half cycle, and the current having the waveform as shown in FIG. 6 ($e$) is applied to the motor, thereby rotating it. In this case, the direction of rotation is determined by the phase of the bridge output and the bridge may be automatically brought into the balanced state by suitably adjusting the arm of the potentiometer 56 by the rotation of the motor. As the bridge reaches its balanced state by the rotation of the motor, the current flowing through SCR 54 changes from FIG. 6 (*f*) to (*f'*) so that the similar or corresponding current is supplied to the motor. Therefore, the rotation of the motor is gradually slowed down and finally stopped when the current supplied becomes the AC waveform as shown in FIG. 6 (*c*).

It is to be understood that in the embodiment of FIG. 5, the waveform of the current supplied to the motor is changed from the half wave rectified to full wave rectified current so as to stop the motor thereby eliminating the hunting of the motor due to the inertia thereof.

FIGS. 7 to 9 illustrate the embodiments of devices for automatically holding in a predetermined position the surface of a body to which is advantageously applied the apparatus in accordance with the present invention. By this application, there is provided a novel automatic surface position control device employing an optical system including a photoconductive element and a servomechanism. As a device for automatically controlling the surface position of members, which are inserted into a frame or the like sequentially, at a predetermined position, there is, for example, an automatic focusing device for slide projectors or the like. One prior art has employed a method in which the light reflected upon the surfaces of the inserted slides is converted into electricity, thereby actuating a servomechanism so as to displace either the slide or a projection lens for automatic focusing. The embodiments illustrated in FIGS. 7 to 9 provide simple and reliable novel control devices by incorporating a photoconductive element and servomotor control means to the automatic control device described above. FIG. 7 is a schematic diagram for explanation of the principle of an automatic surface position control device to which the present invention is advantageously applicable. Reference numeral 70 designates the surface of a controlled member; 71, a light source; 72, a slit; 73, a condenser lens; 74, a focusing lens; 75, a three-terminal photoconductive element such as a CdS; 76, an infrared ray filter; and 78, a servomotor. The light from the light source 71 is impinged upon the surface 70 through the slit 72 and the condenser lens 73 and the reflected light is focused upon the photoconductive element 75 through the focusing lens 74. The photoconductive element 75 used in this embodiment is a CdS having three electrodes 81, 82 and 83 as illustrated in FIG. 8 and is so positioned that the focused slit image may be shifted to the right or left in the figure depending upon the deviation of the slide or the like in the direction normal to the surface thereof. Thus the resistances across the central electrode 82 and the right and left electrodes 83 and 81 are varied from each other, with one resistance increasing while the other resistance decreasing depending upon the place where the slit image is focused. The output of this CdS is used to actuate the servomechanism so as to rotate the servomotor in either direction, thereby precisely controlling the surface of the slide or the like at a predetermined position. As shown in FIG. 9 where same reference numerals are used to designate same parts, in a slide projector or the like, the projection lens 90 and the optical system 91 for detection of the surface to be controlled may be assembled into a unit so as to be moved forwardly and backwardly along the projection optical path by the servomechanism (only a motor 78 is shown), thereby attaining the same effect as in the case of the embodiment shown in FIG. 7. FIG. 10 is a circuit diagram of the inventive control apparatus applicable to the automatic surface position control devices of the type described hereinabove. An AC source 100 is connected to a DC motor (servo-motor) 102 and a bridge rectifier circuit 103 through a transformer 101, and a control circuit consisting of a resistance bridge 105 and an SCR 104 is connected across the DC output terminals of the rectifier 103. The voltage in phase with the AC source 100 is applied to the bridge 105 through the secondary winding 101B of a transformer 101 and the potentiometer 106 is so moved as to adjust the over-all resistance thereof, thereby controlling the direction of rotation and the speed of the servomotor. In the instant embodiment, the three-terminal photoconductive element, such as the CdS, as shown in FIG. 8 is used as a potentiometer 106 which provides two adjacent arms of the bridge 105 in the servomotor control circuit. The slit image is normally so focused as to impinge at the center of the three-terminal photoconductive element 106 when the surface of a member to be controlled is at its normal position. Therefore, when the surface of the object to be controlled is deviated forwardly or backwardly of the normal position or plane the slit image is deviated to right or left from the center of the photoconductive element so that the resistances of the arms of the bridge provided by the CdS are increased and decreased respectively thereby providing the unbalanced output across the bridge output terminals. This unbalanced output fires the SCR so as to rotate the servomotor in the forward or reverse direction, thereby displacing the object to be controlled forwardly or backwardly to its normal position. When the surface of the object to be controlled is positioned in the normal plane or position, the bridge is balanced and output of the bridge is zero so that the servomotor is stopped, thereby holding the surface of the object at its normal position. As shown in FIGS. 7 and 9, when an infrared filter 77 is inserted in the optical path, the automatic control device is responsive only to the infrared rays so that faulty operation due to the light from the exterior may be prevented. It must be noted that when the width *d* of the slit image (See FIG. 8) is made less than the spacing between the center electrode and each of the side electrodes of the CdS, the sensitivity of the servomechanism or system will be increased but the range of operation thereof will be decreased, and vice versa.

In the conventional automatic control of the exposure light for cine-cameras, generally the servo-system is so designed as to directly amplify the input signal thereby actuating the servomotor. However, when the input signal $2^{EV}$ varies from 0 to 18 in exposure value (EV), the speed of the motor varies depending upon the intensity of the input signal. Therefore it has long been desired to solve this problem. Furthermore, the characteristics of the components impose the limitations upon the design when a linear amplifier covering all of the range of variation of input signals is incorporated in the cine-camera, so that it is impossible to rotate a motor at a predetermined speed irrespective of the intensity of the input signals. That is, when it is desired to rotate the motor at a constant speed irrespective of the input to the first stage of the amplifier which varies from a few $\mu A$ to tens of $\mu A$, the output current of a conventional operational amplifier varies depending upon the input signal intensity so that the "dynamic range" is limited. Thus it has been extremely difficult and practically almost impossible to rotate the motor at a constant speed. In order to eliminate such problems and disadvantages as described hereinabove, instead of the conventional linear amplifier, the present invention provides novel apparatus wherein the rotation of a motor in either direction is normally made with a substantially constant load and the direction of rotation is reversed by switching.

FIG. 11 is a schematic diagram for explanation of the principle of the portable type control apparatus in accordance with the present invention. In the figure, a battery 110 is connected to a DC-AC converter 111 to which output a DC motor 112, a gang switch 113 and a rectifier are connected. The rectifier consists of two diodes 114 and 115 connected in parallel with each other and in the opposite direction. The motor 112 may be replaced with various equipments and machines such as an ammeter, reciprocating electromagnet etc. The frequency of the DC-AC converter may be arbitrarily selected so that there arises no problem even when the AC (half wave) is supplied to the DC motor. Furthermore, the provision of the DC-AC converter offers other advantages of serving other functions of the portable machine. In brief, the present invention contemplates the reversible rotation of a DC motor by the ON-OFF control of the switching means with the use of a DC-AC converter which permits the introduction of opposite-polarized switching means such as thyristors, transistors or the like into cine-cameras or the like.

Figure 12:
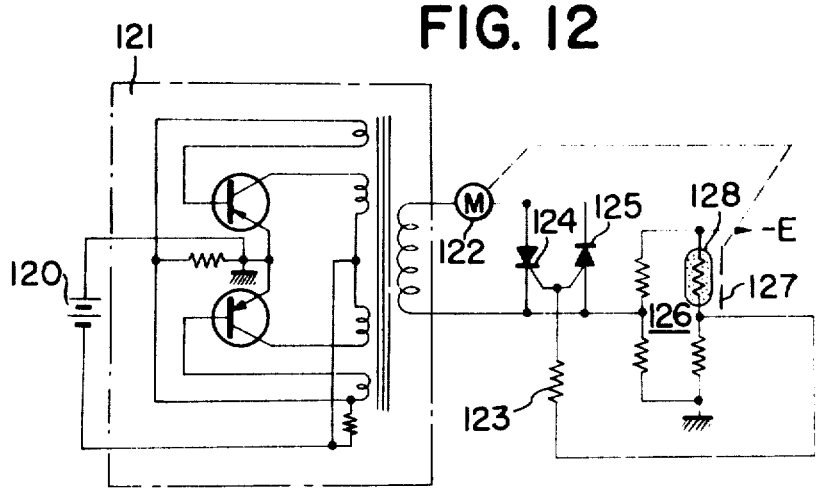
FIGS. 12, 13 and 14 are circuit diagrams of the embodiments of the control apparatus in which the present invention is applied to an automatic exposure value control for cameras.
Figure 13:
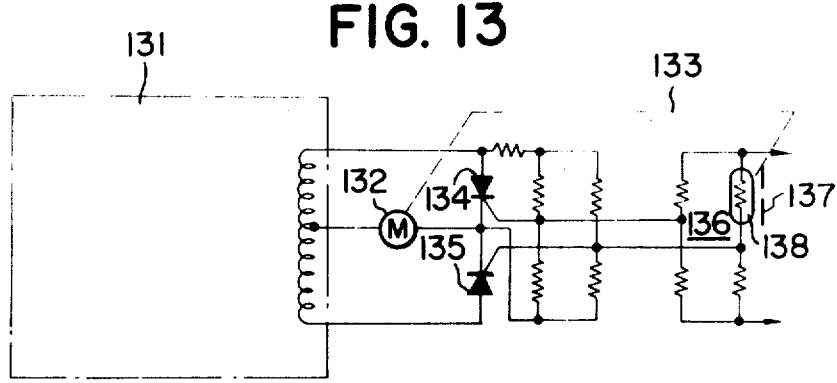
Figure 14:
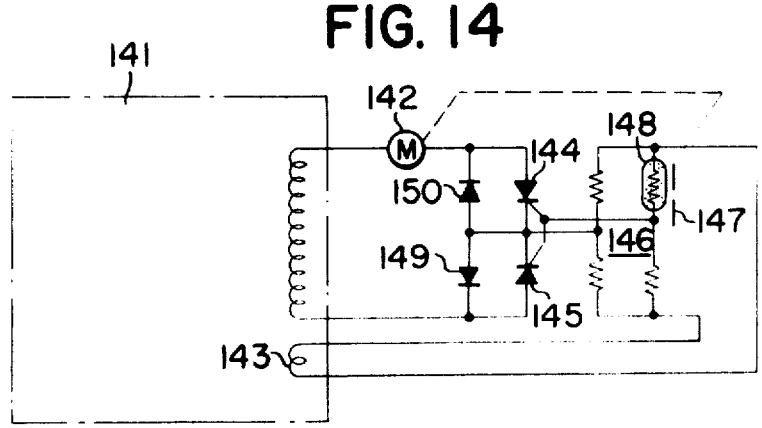

FIGS. 12, 13 and 14 are circuit diagrams of the control apparatus the present invention as applied to a device for automatically controlling the exposure value of a camera. In the embodiment illustrated in FIG. 12, reference numeral 120 designates a battery to which a DC-AC converter is connected whose output is applied to a motor 122 through an output transformer. In the motor driving circuit, P-gate SCR 124 and N-gate SCR 125 are arranged in anti-parallel connection as switching means. These switching means are connected to the motor 122 in series. Both of the gates of the SCR 124 and 125 are connected to one detection terminal of a photometric bridge circuit generally designated by 126 through a lead 123. The other detection terminal of the bridge circuit 126 is connected to one terminal of the switching means. Thus, the motor is driven in the forward or reverse direction by a signal corresponding to the difference between the voltage across the detection terminals of the bridge 126, that is between the actual value due to the brightness of a subject to be photographed, an aperture, etc. and the optimum value. The voltage across the detection terminals of the bridge 126 is varied in response to the light intensity received by a photometric element 128. In the instant embodiment, in order to realize the negative feedback control of the input by the output of the motor, the aperture diaphragms 127 for controlling the light incident upon the photoconductive element 128 is disposed in front of the element 128, interlocking with the motor 122. In the instant embodiment wherein the direction of rotation of the motor is reversed by changing the direction of the current supplied thereto in response to the variation from negative to positive and vice versa in gate voltages of the N-gate and P-gate SCR (CSCR), the current of the order of 20 μA at the highest is sufficient as gate input signals so that the direct coupling system of the instant embodiment operates satisfactorily in practice. It is seen that an amplifier may be interposed for achieving a higher degree of precision. In the embodiment illustrated in FIG. 13, a motor 132 is center-tapped to the winding of a transformer 131, and SCR's 134 and 135 of the same type are used. The gate electrode of SCR 134 is connected to one detection terminal of a bridge 136 while the gate electrode of SCR 136, to the other detection terminal thereof. Therefore, the SCR's are controlled by the unbalancing of the bridge 146, thereby changing the direction of the current to be supplied to the motor 132 so as to reverse the direction of rotation thereof.

In the embodiment illustrated in FIG. 14, in addition to an output winding for driving a motor 142 a secondary output winding 143 is arranged in phase with the output winding for the motor 142 for supplying the current to the control bridge circuit. Thus the SCR's as switching means are phase controlled. The direction of rotation of the motor 142 may be reversed through the circuit consisting of SCR 144 and a diode 149 or through the circuit consisting of SCR 145 and a diode 150. The control of the phase in firing the SCR's 144 and 145 is accomplished by the output from the bridge 146 having a photometric element 148 in one arm thereof, based upon the same principle as described in connection with the embodiment with reference to FIG. 3. So far the SCR has been described as being a switching element in the above described embodiments, but it will be understood that other suitable switching elements such as transistors may be used. The photometric or photoconductive element arranged as one arm of the bridge is not limited to CdS, but other suitable means may be used.

We claim:

1. A D.C. control apparatus which comprises: D.C. motor means capable of being driven by an alternating current source; switching means; a resistance bridge having at least one variable element; and a feed-back connection from said D.C. motor means to said resistance bridge, said switching means being operable by an output signal derived from pick-up terminals of said resistance bridge to which is applied an alternating current having the same frequency as that of said alternating current source, and being driven into a non-conductive state when an unbalanced output signal across said pick-up terminals of said resistance bridge is zero and is driven into a conductive state when an unbalanced output signal across said pick-up terminals of said bridge has a value other than zero or in said proximity of zero, said feed-back connection being adapted to bring said resistance bridge into its balanced condition, thereby effecting the phase control of said D.C. motor means.

2. A D.C. motor control apparatus according to claim 1, wherein said AC source is derived from the output of a DC-AC converter connected in series to a DC source.

3. A D.C. motor control apparatus according to claim 1, wherein said switching means are connected to DC output terminals of a bridge rectifier, and the alternating current having the same frequency as said alternating current having the same frequency as said alternating current source is applied to said resistance bridge in phase with said alternating current applied to said DC motor means.

4. A D.C. control apparatus D.C. motor means capable of being driven by an alternating current source, switching means, a resistance bridge having at least one variable element, and a feed-back connection from said D.C. motor means to said resistance bridge, said switching means being operable by an output signal derived from pick-up terminals of said resistance bridge to which is applied an alternating current source, and being driven into a conductive state when an unbalanced output signal across said pick-up terminals of said resistance bridge is zero or in the proximity of zero, said feed-back connection being adapted to bring said resistance bridge into its balanced condition and thereby the presence of the unbalanced output signal across said pick-up terminals of said bridge phase controls the non-conductive state of said switching means, thereby to provide a damping effect to said D.C. motor means.

5. A D.C. motor control apparatus which comprises: D.C. motor means capable of being driven by an alternating current source, switching means, a resistance bridge a three terminal photoconductive element mounted in two adjacent arms of said resistance bridge, feed-back connection means from said D.C. motor means to said resistance bridge; a light source and a light reflecting and deflecting means provided in such manner that the light from said light source is impinged upon said photoconductive element through said light reflecting and deflecting means, said switching means being operable by an output signal derived from pick-up terminals of said resistance bridge to which is applied an alternating current having the same frequency as that of said alternating current source, said feed-back connection being adapted to bring said resistance bridge into its balanced condition, and upon the change of the relative position of at least one of said photoconductive element, light source, or light reflecting and deflecting means, said resistance bridge is automatically brought into a balanced state.

6. A D.C. motor control apparatus which comprises: D.C. motor means capable of being driven by an alternating current source; switching means; a resistance bridge having a photoconductive element arranged as one arm thereof; aperture means arranged for controlling the quantity of light incident upon said photoconductive element a feed-back connection from said D.C. motor means to said resistance bridge, said switching means being operable by an output signal derived from pick-up terminals of said resistance bridge to which is applied an alternating current having the same frequency as that of said alternating current source; said feed-back connection being adapted to bring said resistance bridge into its balanced condition; and said photoconductive element is controlled by said D.C. motor means thereby automatically bringing said resistance bridge into a balanced state.

7. A D.C. motor control apparatus according to claim 5, wherein said light reflecting and deflecting means is a surface of a film to be projected by a projector or the like; and the light from said light source is reflected upon the surface of said film and is then impinged upon said photoconductive element.

* * * * *